United States Patent [19]

Caspar et al.

[11] 4,104,925

[45] Aug. 8, 1978

[54] PRESSURE OR PRESSURE DIFFERENCE MEASURING APPARATUS

[75] Inventors: Heinz Caspar; Felix Kudritzki, both of Berlin, Fed. Rep. of Germany

[73] Assignee: Siemens Aktiengesellschaft, Munich, Fed. Rep. of Germany

[21] Appl. No.: 799,169

[22] Filed: May 23, 1977

[30] Foreign Application Priority Data

May 26, 1976 [DE] Fed. Rep. of Germany ....... 2623994

[51] Int. Cl.² .............................................. G01L 7/08
[52] U.S. Cl. .................................................... 73/716
[58] Field of Search ..................... 73/407 R, 406, 410, 73/398 R

[56] References Cited

U.S. PATENT DOCUMENTS

| 3,136,970 | 6/1964 | Pegram ................................. 73/406 |
| 3,411,363 | 11/1968 | Danvic et al. ..................... 73/407 R |
| 3,869,920 | 3/1975 | Miyauchi et al. .................. 73/407 R |

Primary Examiner—Donald O. Woodiel
Attorney, Agent, or Firm—Kenyon & Kenyon, Reilly, Carr & Chapin

[57] ABSTRACT

An instrument for measuring pressure comprising at least one diaphragm which is adapted to be responsive to a pressure or a pressure difference, and a displacement member which is arranged in a first plane parallel to the plane of the diaphragm and is swingable about a pivot axis which lies in the first plane and is removed from a connecting member. The apparatus further includes a connecting member for connecting the diaphragm and displacement member. The connecting member is arranged so as to be rigidly fastened to the diaphragm on the side of the diaphragm facing away from the displacement member and outside the plane of the diaphragm.

5 Claims, 3 Drawing Figures

PRESSURE OR PRESSURE DIFFERENCE MEASURING APPARATUS

BACKGROUND OF THE INVENTION

1. Field of the Invention

The invention relates to a pressure or pressure difference measuring instrument comprising at least one diaphragm which is adapted to be responsive to a pressure or a pressure difference and which is connected by a connecting member to a displacement member, the latter member being arranged in a first plane parallel to the plane of the diaphragm and being swingable about a pivot axis which lies in the first plane and is removed from the connecting element.

2. Description of the Prior Art

In one known pressure difference measuring instrument of the above type, the diaphragm which is responsive to the pressure difference is connected via a plunger to a displacement member having the form of a transmission lever. The plunger is connected by welding, for example, to the diaphragm in the plane of the diaphragm. The plunger is also welded to the transmission lever, which is held at one end by a leaf spring supported in the housing of the instrument and executes with its other end a swinging movement corresponding to the difference pressure being measured. Difficulties can arise with the aforesaid pressure measuring instrument in connection with the diaphragm thereof, as due to the construction of the instrument, the diaphragm is deflected asymmetrically by the plunger when the transmission lever swings and is thereby heavily stressed at individual points.

In another known pressure difference measuring instrument, two diaphragms acted upon, respectively, by a higher and a lower pressure are each connected, via respective connecting elements to a resilient bendable tubular member acting as a measuring spring and into which is inserted a rotatable control rod. The control rod executes a swinging movement about a fictitious pivot point under the influence of a pressure difference, the diaphragms being deflected nonuniformly because of the rigid connection between the resilient tubular member and the diaphragms. This type of deflection causes an overload in individual zones of the diaphragms and leads to premature contact of the diaphragms with their respective backings, if the spacing between the diaphragms and the backings is small.

It is an object of the present invention to provide a pressure or pressure difference measuring apparatus with at least one diaphragm adapted to be responsive to a pressure or a pressure difference and in which nonuniform deflection of the diaphragm when the displacement member of the instrument is swung is avoided in a simple reliable manner.

SUMMARY OF THE INVENTION

In accordance with the principles of the present invention, the above and other objectives are accomplished in an apparatus for measuring pressure comprising at least one diaphragm, and a displacement member which is arranged in a first plane parallel to the plane of the diaphragm and is swingable or pivotable about a pivot axis which lies in the first plane and is removed from a connecting member. The measuring apparatus is further provided with a connecting member for connecting the diaphragm and the displacement member; the connecting member being rigidly fastened to the diaphragm on the side thereof facing away from the displacement member and so as to lie outside the plane of the diaphragm.

With the pressure measuring apparatus so configured, a nonuniform deflection of the diaphragm in the event of a swinging movement of the displacement member is avoided, since the connection point of the connecting member and the diaphragm now lies outside of the plane of the diaphragm. Moreover, additional cost in the manufacture of the apparatus is not incurred, as the connecting member must be connected to the diaphragm in any case.

Since the nonuniform deflection of the diaphragm is avoided with the apparatus of the invention, the diaphragm may be supported with a very small spacing from a respective backing member. Thus, particularly in an apparatus having two diaphragms, the volume between the diaphragms can be kept relatively small. This, in turn, has the advantage that thermal expansion of the volume becomes negligible, and thus, changes of the effective diaphragm area and their effects are avoided. The measuring accuracy of the apparatus of the invention is, therefore, independent of temperature changes to a very large extent.

The connection of the connecting member is particularly effective, however, if the distance between the point at which the connecting member is attached to the diaphragm and the plane of the diaphragm is about four-tenths of the distance of the diaphragm plane from the displacement member. For a smaller or larger distance of the attachment point from the plane of the diaphragm, the effect is respectively somewhat smaller.

It is further advantageous in the apparatus of the invention to include therein a further member connected centrally to the diaphragm and protruding from the plane of the diaphragm and to connect the connecting member to this further member.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
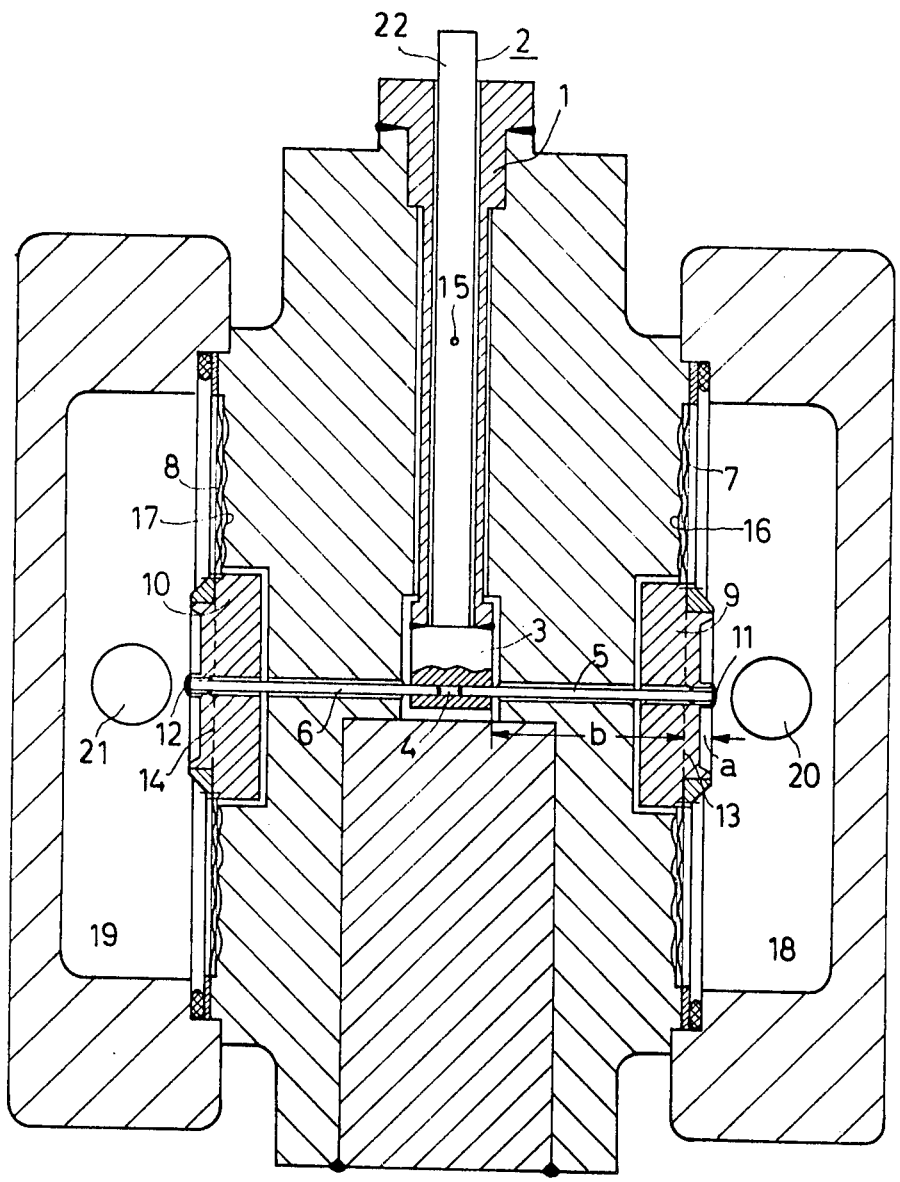
FIG. 1 shows an apparatus for measuring pressure in accordance with the principles of the present invention.

FIG. 1 shows an apparatus for measuring pressure in accordance with the principles of the present invention. As shown, the apparatus comprises a bendable tubular member 1 which acts as a measuring spring and into whose interior has been inserted a control rod 2 which acts as a displacement member. At one end 3, the control rod 2 is provided with a hole or bore 4, into which is inserted from opposite ends connecting elements 5 and 6 which are in the form of rods and may be fastened to rod 2, for example, by welding. The other ends of the connecting elements 5 and 6 are rigidly connected to respective diaphragms 7 and 8 via members 9 and 10 which are arranged centrally of the diaphragms. The attachment of the connecting elements 5 and 6 to the members 9 and 10 may also be accomplished, for example, by welding. The respective connections of the elements 5 and 6 to their respective members 9 and 10 are at points 11 and 12 of the members 9 and 10, the latter points being at a finite distance $a$ away from the planes 13 and 14 of their respective diaphragms and on the side thereof facing away from the control rod 2. Advantageously, the distance $a$ can be selected to be about four-tenths of the distance $b$ between the control rod 2 and the respective planes 13 and 14.

With the elements 5 and 6 attached to the diaphragms 7 and 8 via the attachments points 11 and 12 which lie outside the planes 13 and 14 of the diaphragms, no asymmetrical deflection of the diaphragms 7 and 8 relative to their central axis occurs when the end 3 of the control rod 2 is swung about a fictitious pivot axis 15. The diaphragms 7 and 8, therefore, cannot make contact unilaterally with their respective diaphragm backing members 16 and 17, even when the latter members are arranged at relatively small spacings from their respective diaphragms.

Figure 2:
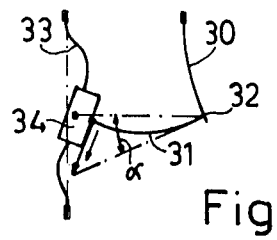
FIGS. 2 and 3 illustrate schematically the various forces acting on the apparatus of FIG. 1 when in operation.

The aforesaid advantageous results realized with the apparatus of the invention shown in FIG. 1 will now be explained more fully by making reference to the diagrams of FIGS. 2 and 3. More particularly, as shown in these diagrams, a displacement member 30 is swung with its end 32 connected to a connecting element 31 in accordance with a pressure on a diaphragm 33. In FIG. 2, the connecting element is rigidly fastened to a further member 34 disposed centrally of a diaphragm 33 on the side of the diaphragm facing the displacement member 30. This connection of the displacement member to the further member 34 causes the connecting element 31 to bend, as is shown in FIG. 2. This bending, in turn, results in an asymmetrical deflection of the diaphragm 33, which leads to unilateral contact of the diaphragm and, thus, to measuring errors, when the spacing of the diaphragm from its respective diaphragm backing member is small.

Figure 3:
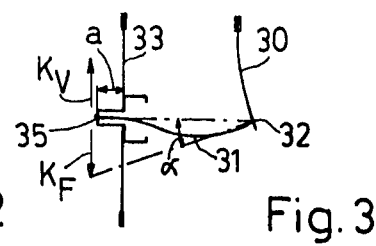

If, on the other hand, the connecting element 31 is attached to an attachment point 35 at a distance $a$ from the plane of the diaphragm on the side of the diaphragm 33 facing away from the displacement member 30, in accordance with the invention, as is shown in FIG. 3, then the torque due to a force $K_F$ on the connecting element 31 is cancelled by a further torque caused by a further force $K_V$, and the diaphragm 33 is not deflected unilaterally. In this case, the force $K_F$ is the force which occurs due to the deflection of the connecting element 31 through an angle $\gamma$, as a result of the swinging movement of the displacement member 30. The force $K_V$, on the other hand, is the force action of the bent connecting element 31 which is rigidly fastened at the attachment point 35.

In the apparatus of FIG. 1, the diaphragms 7 and 8 are acted upon by different pressures which are coupled to pressure chambers 18 and 19 via openings 20 and 21. The control rod 2 is, therefore, swung about a fictitious pivot 15 by the connecting elements 5 and 6 so that the outer end 22 of the control rod 2 moves in a plane substantially orthogonal to the plane of the diaphragms 7 and 8 and through a distance which corresponds to the pressure difference acting on the diaphragms.

What is claimed is:

1. An apparatus for measuring one of pressure and differential pressure comprising:
    at least one diaphragm which is adapted to be responsive to said one of pressure and differential pressure, said diaphragm including first and second diaphragm portions, said first diaphragm portion having opposing outer surface portions one of which defines a diaphragm plane, and said second diaphragm portion projecting outwardly from said diaphragm plane on one side thereof;
    a displacement member arranged in a first plane parallel to and on the other side of said diaphragm plane and swingable about a pivot axis which lies in said first plane
    and a connecting member displaced from said pivot axis, said connecting member connecting said displacement member to said diaphragm and being rigidly fastened to said outwardly projecting second diaphragm portion.

2. Apparatus in accordance with claim 1 wherein:
    the distance from said diaphragm plane to the region at which said connecting member is fastened to said outwardly projecting second diaphragm portion is about four-tenths the distance from said displacement member to said diaphragm plane.

3. Apparatus in accordance with claim 1 wherein:
    said second diaphragm portion includes a further member which is connected to said first diaphragm portion centrally thereof and which projects outwardly from said diaphragm plane on said one side thereof;
    and said connecting member is fastened to said further member.

4. Apparatus in accordance with claim 1 further comprising:
    another diaphragm adapted to be responsive to one of said pressure and said differential pressure, said other diaphragm including third and fourth diaphragm portions, said third diaphragm portion having opposing surface portions a first of which defines another diaphragm plane, and said fourth diaphragm portion projecting outwardly from said other diaphragm plane on a first side thereof;
    and another connecting member, said other connecting member connecting said displacement member to said other diaphragm and being rigidly fastened to said outwardly projecting fourth diaphragm portion.

5. Apparatus in accordance with claim 4 wherein:
    said other diaphragm is disposed such that said other diaphragm plane is parallel to said diaphragm plane and such that said other diaphragm faces a side of said displacement member which is opposite to the side of said displacement faced by said diaphragm.

* * * * *